(12) United States Patent
Yun et al.

(10) Patent No.: US 11,791,495 B2
(45) Date of Patent: Oct. 17, 2023

(54) SEPARATOR FOR LITHIUM ION SECONDARY BATTERY AND LITHIUM METAL BATTERY INCLUDING THE SAME

(71) Applicant: LG CHEM, LTD., Seoul (KR)

(72) Inventors: Hyun-Woong Yun, Daejeon (KR); Jong-Pil Jegal, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 150 days.

(21) Appl. No.: 16/614,791

(22) PCT Filed: Dec. 6, 2018

(86) PCT No.: PCT/KR2018/015452
§ 371 (c)(1),
(2) Date: Nov. 18, 2019

(87) PCT Pub. No.: WO2019/112353
PCT Pub. Date: Jun. 13, 2019

(65) Prior Publication Data
US 2020/0203694 A1    Jun. 25, 2020

(30) Foreign Application Priority Data
Dec. 6, 2017    (KR) .................. 10-2017-0166991

(51) Int. Cl.
| | | |
|---|---|---|
| *H01M 10/052* | (2010.01) | |
| *H01M 10/0525* | (2010.01) | |
| *H01M 50/417* | (2021.01) | |
| *H01M 50/426* | (2021.01) | |
| *H01M 50/431* | (2021.01) | |
| *H01M 50/443* | (2021.01) | |
| *H01M 50/446* | (2021.01) | |
| *H01M 50/457* | (2021.01) | |
| *H01M 50/489* | (2021.01) | |
| *H01M 50/451* | (2021.01) | |
| *H01M 50/434* | (2021.01) | |

(52) U.S. Cl.
CPC ..... *H01M 10/052* (2013.01); *H01M 10/0525* (2013.01); *H01M 50/417* (2021.01); *H01M 50/426* (2021.01); *H01M 50/431* (2021.01); *H01M 50/443* (2021.01); *H01M 50/446* (2021.01); *H01M 50/451* (2021.01); *H01M 50/457* (2021.01); *H01M 50/489* (2021.01); *H01M 50/434* (2021.01)

(58) Field of Classification Search
None
See application file for complete search history.

(56) References Cited

U.S. PATENT DOCUMENTS

| | | |
|---|---|---|
| 2006/0046149 A1 | 3/2006 | Yong et al. |
| 2006/0251945 A1 | 11/2006 | Song et al. |
| 2007/0009803 A1 | 1/2007 | Kim et al. |
| 2010/0167124 A1 | 7/2010 | Seo et al. |
| 2011/0045168 A1 | 2/2011 | Seo et al. |
| 2012/0251869 A1* | 10/2012 | Lee ............... H01M 50/446 429/144 |
| 2016/0248063 A1* | 8/2016 | Jang ............... H01M 50/449 |
| 2017/0155114 A1 | 6/2017 | Kurakane |
| 2018/0006285 A1* | 1/2018 | Lee ............... H01M 50/426 |
| 2018/0026307 A1 | 1/2018 | Jeon et al. |

FOREIGN PATENT DOCUMENTS

| | | |
|---|---|---|
| CN | 1764001 A | 4/2006 |
| CN | 101317284 A | 12/2008 |
| CN | 103155258 A | 6/2013 |
| JP | 2015-088430 A | 5/2015 |
| JP | 2015088430 * | 5/2015 |
| KR | 10-2006-0050976 A | 5/2006 |
| KR | 10-2007-0082578 A | 8/2007 |
| KR | 10-0770105 B1 | 10/2007 |
| KR | 10-2012-0035359 A | 4/2012 |
| KR | 10-2012-0103948 A | 9/2012 |
| KR | 10-2013-0123748 A | 11/2013 |
| KR | 10-1358764 B1 | 2/2014 |
| KR | 10-2014-0037660 A | 3/2014 |
| KR | 10-2015-0137901 A | 12/2015 |
| KR | 10-2016-0046386 A | 4/2016 |
| KR | 10-2016-0129598 A | 11/2016 |
| KR | 101709697 * | 2/2017 |
| KR | 10-2018-0031649 A | 3/2018 |
| WO | 2008/034295 A1 | 3/2008 |
| WO | 2016/108495 A1 | 7/2016 |

OTHER PUBLICATIONS

Extended European Search Report dated Oct. 15, 2020 issued by the European Patent Office for corresponding European patent application No. 18885823.7.
International Search Report issued in corresponding International Patent Application No. PCT/KR2018/015452, dated Mar. 21, 2019.
Office Action dated Oct. 11, 2021 issued by the Chinese Patent Office for corresponding Chinese Patent Application No. 201880031727.2.

* cited by examiner

*Primary Examiner* — Dustin Q Dam
(74) *Attorney, Agent, or Firm* — Morgan, Lewis & Bockius LLP

(57) ABSTRACT

The present disclosure relates to a separator for a lithium metal battery and a lithium ion secondary battery including the same. The separator is provided with a porous coating layer including a high content of binder resin. The content of binder resin in the porous coating layer is 25 wt % or more based on 100 wt % of the porous coating layer, and the porous coating layer faces a negative electrode.

17 Claims, No Drawings

SEPARATOR FOR LITHIUM ION SECONDARY BATTERY AND LITHIUM METAL BATTERY INCLUDING THE SAME

TECHNICAL FIELD

The present application claims priority to Korean Patent Application No. 10-2017-0169991 filed on Dec. 6, 2017 in the Republic of Korea. The present disclosure relates to a separator for a lithium ion secondary battery and a lithium ion secondary battery including the same. More particularly, the lithium ion secondary battery is a lithium metal secondary battery including lithium metal as a negative electrode active material.

BACKGROUND ART

As technological development and a demand for mobile instruments have been increased, secondary batteries have been increasingly in demand as energy sources. Among such secondary batteries, a lithium metal secondary battery using lithium metal or a lithium alloy as a negative electrode having high energy density has been given many attentions.

A lithium metal secondary battery refers to a secondary battery using lithium metal or a lithium alloy as a negative electrode. Lithium metal has a low density of 0.54 g/cm$^3$ and a significantly low standard reduction potential of −3.045 V (SHE: based on the standard hydrogen electrode), and thus has been most spotlighted as an electrode material for a high-energy density battery.

Although a lithium metal battery theoretically has significantly high energy capacity, it causes a severe side reaction with an electrolyte due to high chemical/electrochemical reactivity to form a thick resistance layer on the surface of an electrode, resulting in an increase in resistance of a battery and degradation of capacity during charge/discharge. In addition, a lithium metal battery has a problem of rapid degradation of cell performance due to the depletion of an electrolyte caused by rapid decomposition of the electrolyte. Therefore, it is an important technical problem to stabilize the interface between lithium metal and an electrolyte. According to the related art, some studies have been conducted to reduce the reactivity between a negative electrode and an electrolyte by forming a stable solid electrolyte interface (SEI) layer on the surface of a lithium metal negative electrode. In addition, use of a solid electrolyte instead of a lithium electrolyte in a lithium metal battery may be considered. However, in the case of a solid electrolyte, it has a problem of low ion conductivity.

DISCLOSURE

Technical Problem

The present disclosure is designed to solve the problems of the related art, and therefore the present disclosure is directed to providing a separator for a lithium metal secondary battery. The present disclosure is also directed to providing a lithium metal secondary battery prevented from degradation of cell performance caused by the depletion of an electrolyte. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

According to an embodiment of the present disclosure, there is provided a separator for an electrochemical device which includes: a porous substrate; a first porous coating layer formed on one surface of the porous substrate; and a second porous coating layer formed on the other surface of the porous substrate, wherein the first porous coating layer includes inorganic particles and a first binder resin, the content of the binder resin is 1-15 wt % based on 100 wt % of the first porous coating layer, the second porous coating layer includes a filler containing at least one selected from the group consisting of organic fillers and inorganic fillers and a second binder resin, and the content of the second binder resin is 25-40 wt % based on 100 wt % of the second porous coating layer.

According to the second embodiment of the present disclosure, there is provided the separator as defined in the first embodiment, wherein the inorganic filler of the second porous coating layer includes porous particles.

According to the third embodiment of the present disclosure, there is provided the separator as defined in the first or the second embodiment, wherein the porous particle includes at least one selected from zeolite, aluminophosphate, aluminosilicate, titanosilicate, calcium phosphate, zirconium phosphate and silica gel.

According to the fourth embodiment of the present disclosure, there is provided the separator as defined in any one of the first to the third embodiments, wherein the second binder resin has a volumetric swelling degree of 5% or more with an electrolyte.

According to the fifth embodiment of the present disclosure, there is provided the separator as defined in any one of the first to the fourth embodiments, wherein the second binder resin has a volumetric swelling degree of 30-80% in the presence of an electrolyte.

According to the sixth embodiment of the present disclosure, there is provided the separator as defined in any one of the first to the fifth embodiments, wherein the second binder resin includes polyvinylidene fluoride-co-hexafluoropropylene (PVdF-HFP) containing hexafluoroporpylene (HFP) as a comonomer.

According to the seventh embodiment of the present disclosure, there is provided the separator as defined in any one of the first to the sixth embodiments, wherein PVdF-HFP is a swellable binder resin which undergoes volumetric swelling by absorbing an electrolyte.

According to the eighth embodiment of the present disclosure, there is provided the separator as defined in any one of the first to the seventh embodiments, wherein the second porous coating layer has a thickness of 1-20 µm.

According to the ninth embodiment of the present disclosure, there is provided the separator as defined in any one of the first to the eighth embodiments, wherein the porous substrate is a polymer sheet which includes a polyolefinic polymer material and has at least one type of pores selected from open pores and closed pores.

According to the tenth embodiment of the present disclosure, there is provided a lithium ion secondary battery which includes a positive electrode, a negative electrode, a separator interposed between the positive electrode and the negative electrode, and an electrolyte, wherein the separator is any one of the above-defined separators and is disposed in such a manner that the second porous coating layer of the separator faces the negative electrode.

According to the eleventh embodiment of the present disclosure, there is provided the lithium ion secondary battery as defined in the tenth embodiment, wherein the negative electrode includes lithium metal as a negative electrode active material.

According to the twelfth embodiment of the present disclosure, there is provided the lithium ion secondary battery as defined in the tenth or the eleventh embodiment, wherein the PVdF-based binder resin contained in the second porous coating layer of the separator has a swelling degree of 5% or more in the presence of an electrolyte, and the electrolyte includes an organic solvent for an electrolyte and a lithium salt.

Advantageous Effects

The separator according to the present disclosure has a high content of binder resin contained in the second porous coating layer that faces a negative electrode, and thus shows a high amount of electrolyte held by the binder resin. In addition, the present disclosure provides a lithium metal battery using lithium metal as a negative electrode active material, wherein a porous coating layer having a high content of binder resin is disposed in such a manner that it faces a negative electrode. Thus, it is possible to impede depletion of an electrolyte of a lithium metal battery. As a result, the lithium metal battery according to the present disclosure has significantly improved life characteristics.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected electrically to another portion' by way of the other element interposed between them.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The present disclosure relates to a separator for a lithium ion secondary battery and a lithium ion secondary battery including the same. According to an embodiment of the present disclosure, the lithium ion secondary battery is a lithium metal battery including lithium metal as a negative electrode active material.

Separator

According to an embodiment of the present disclosure, the separator includes a porous substrate, a first porous coating layer formed on one surface of the porous substrate; and a second porous coating layer formed on the other surface of the porous substrate.

Porous Substrate

Herein, the porous substrate is a porous ion-conducting barrier which interrupts electrical contact between a negative electrode and a positive electrode, while allowing passage of ions and may be a polymer sheet including a plurality of pores. The pores include open pores and/or closed pores and are interconnected so that a gas or liquid may pass from one surface of the substrate to the other surface of the substrate.

The material forming such a porous substrate may be any one of organic materials and inorganic materials having electrical insulation property. Particularly, from a viewpoint of imparting a shut-down function to the substrate, it is preferred to use a thermoplastic resin as a material for forming the substrate. Herein, the term 'shut-down function' refers to a function of interrupting ion transport by closing the pores of a porous substrate with a molten thermoplastic resin, when the temperature of a battery is increased, thereby preventing a thermal run-away of the battery. The thermoplastic resin suitably includes one having a melting point less than 200° C. For example, the thermoplastic resin may include polyolefin. The polyolefin resin is not particularly limited but typical examples thereof may include at least one of polyethylene, polypropylene and polybutylene.

In addition, separately from such polyolefin or in combination with such polyolefin, it is possible to use at least one selected from polyethylene terephthalate, polybutylene terephtalate, polyacetal, polyamide, polycarbonate, polyimide, polyetherether ketone, polyether sulfone, polyphenylene oxide, polyphenylene sulfide and polyethylene naphthalene.

The porous substrate may include at least one of extruded/oriented films made of polymer materials and non-woven webs obtained by filamentizing and compressing polymer materials. For example, the porous substrate may be any one of the following a) to e):

a) a porous film formed by melting and extruding a polymer resin, b) a multi-layer film formed by stacking two or more layers of the porous films as defined in a), c) a non-woven web produced by integrating filaments obtained by melting/spinning a polymer resin, d) a multi-layer film formed by stacking two or more layers of the non-woven webs as defined in c), and e) a multi-layer porous composite film including two or more of a) to d).

According to the present disclosure, the porous substrate may have a thickness of 5-50 μm. Although the thickness of the porous substrate is not limited to the above-defined range, a porous substrate having a thickness excessively smaller than the above-defined lower limit may cause degradation of mechanical properties, and thus the separator may be damaged with ease during the use of a battery. Meanwhile, although the pore size and porosity of the substrate are not particularly limited, the pore size and porosity may be 0.01-50 μm and 10-95%, respectively.

First Porous Coating layer

According to an embodiment of the present disclosure, a first porous coating layer is provided on one surface of the separator substrate. As described hereinafter, in the separator according to the present disclosure, the first porous coating layer may face a positive electrode, when the separator is applied to a lithium metal battery.

The first porous coating layer is formed by mixing a plurality of inorganic particles with a first binder resin. In the separator according to the present disclosure, the surface of the porous substrate is coated with inorganic particles so that the porous substrate may have improved heat resistance and mechanical properties. The first porous coating layer includes inorganic particles closely packed therein and has a plurality of micropores derived from interstitial volumes formed among the inorganic particles. The micropores are interconnected and show a porous structure which allows passage of a gas or liquid from one surface to the other surface. According to an embodiment of the present disclosure, the inorganic particles are surface-coated totally or partially with the binder resin and are bound to each other through face-to-face binding and/or dot-to-dot binding by means of the binder resin. Meanwhile, as used herein, the term 'interstitial volume' means a space defined by the adjacent inorganic particles substantially in contact with each other.

According to the present disclosure, the first porous coating layer includes the first binder resin in an amount of 1-15 wt % based on 100 wt % of the porous coating layer. When the content of the first binder resin is excessively high beyond the above-defined range, the resistance of the separator is increased to cause degradation of battery performance. Meanwhile, when the content of the binder resin is less than the above-defined range, adhesion between an electrode and the separator may be degraded and the inorganic particles contained in the first porous coating layer may be separated from the coating layer.

According to an embodiment of the present disclosure, the first porous coating layer has an average pore size of 20-1,000 nm. Within the above-defined range, the first porous coating layer may have an average pore size of 800 nm or less, or 500 nm or less. Independently from this or in addition to this, the first porous coating layer may have an average pore size of 20 nm or more, 50 nm or more, or 100 nm or more. For example, the first porous coating layer has an average pore size of 20-800 nm. The pore size may be calculated from shape analysis through scanning electron microscopic (SEM) images. When the pore size is smaller than the above-defined range, the pores may be blocked with ease due to the swelling of the binder resin in the coating layer. When the pore size is not within the above-defined range, it is difficult for the separator to function as an insulating layer and self-discharge characteristics may be degraded after the manufacture of a secondary battery.

According to an embodiment of the present disclosure, the first porous coating layer may have a porosity of 40-80%, or 50% or more, with a view to lithium ion permeability. In addition, with a view to adhesion, the porosity may be 70% or less, or 60% or less. Within the above-defined range, the surface opening ratio is not significantly high, and thus is suitable for ensuring adhesion between the separator and an electrode. The porosity may be measured by preparing slurry for forming the first porous coating layer and applying the slurry to a release film to form a separate first porous coating layer. In other words, it is possible to set a composition and processing condition which can ensure the porosity within the above-defined range by an experimental method and to apply the same to an actual manufacturing process.

Meanwhile, according to the present disclosure, the porosity and pore size may be determined by using scanning electron microscopic (SEM) images, by using BELSORP (BET apparatus) available from BEL Japan Co. using an adsorption gas such as nitrogen, or through a method, such as mercury intrusion porosimetry or capillary flowporosimetry. In a variant, according to another embodiment of the present disclosure, the thickness and weight of the resultant coating layer may be measured to calculate porosity from the theoretical density of the coating layer.

The first porous coating layer preferably has a thickness of 1.5-5.0 μm. More preferably, the first porous coating layer has a thickness of 1.5 μm or more. Within the above-defined range, it is possible to provide high adhesion to an electrode and increased cell strength of a battery. Meanwhile, it is advantageous for the first porous coating layer to have a thickness less than 5.0 μm in terms of cycle characteristics and resistance characteristics of a battery.

Non-limiting examples of the first binder resin that may be used in the present disclosure include any one selected from the group consisting of polyvinylidene fluoride (PVdF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethyl pullulan, cyanoethylpolyvinyl alcohol, cyanoethyl cellulose, cyanoethyl sucrose, pullulan, carboxymethyl cellulose, and combinations thereof.

Meanwhile, according to an embodiment of the present disclosure, it is not essentially required for the binder polymer to have ion conductivity. However, when using a polymer resin having ion conductivity, it is possible to further improve the performance of an electrochemical device. Therefore, a binder polymer having a dielectric constant as high as possible may be used.

In addition, the binder resin has a glass transition temperature ($T_g$) of −100 to 200° C. may be used. This is because such a binder resin can improve the mechanical properties, such as flexibility and elasticity, of the separator. Further, such a binder resin stably fixes binding between the inorganic particles, and thus contributes to prevention of degradation of mechanical properties of the resultant porous coating layer.

According to an embodiment of the present disclosure, the inorganic particles preferably undergo no change in physical properties even at a high temperature of 200° C. or higher. In addition, the inorganic particles are not particularly limited, as long as they are electrochemically stable. In other words, the inorganic particles are not particularly limited, as long as they cause no oxidation and/or reduction in the operating voltage range (e.g. 0-5 V based on Li/Li$^+$) of an applicable electrochemical device. According to an embodiment of the present disclosure, the inorganic particles may include any one selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$(PMN-PT, $0<x<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $SiC$, $TiO_2$, and combinations thereof.

According to an embodiment of the present disclosure, the particle size of the inorganic particles in the porous coating layer is not particularly limited. However, with a view to formation of a coating layer having a uniform thickness and an adequate porosity, the particle size may be 0.001-10 µm. When the inorganic particles satisfy the above-defined range, it is easy to maintain dispersibility and to control the physical properties of the separator, and it is possible to prevent an increase in thickness of the porous coating layer. Thus, it is possible to improve the mechanical properties. In addition, it is possible to reduce an internal short-circuit during charge/discharge caused by an excessively large pore size.

The porous coating layer may be obtained by introducing the inorganic particles to a mixture containing the binder resin dissolved or dispersed in a suitable solvent to form homogeneous slurry, and coating one surface of the porous substrate with the slurry. The coating may be carried out by dip coating, die coating, roll coating, comma coating or a combination thereof.

Second Porous Coating Layer

According to an embodiment of the present disclosure, a second porous coating layer is provided on the other surface of the separator substrate. As described hereinafter, the second porous coating layer faces a negative electrode, when manufacturing a battery, and the negative electrode includes lithium metal as a negative electrode active material.

According to an embodiment of the present disclosure, the second porous coating layer is formed by mixing a filler including at least one selected from the group consisting of organic fillers and inorganic fillers with a second binder resin.

The second porous coating layer allows coating of the surface of the porous substrate with inorganic particles, like the first porous coating layer, and thus improves the heat resistance and mechanical properties of the separator. In addition, the second porous coating layer has a higher content of binder resin as compared to the first porous coating layer, and thus can functions as an electrolyte reservoir capable of providing against electrolyte depletion. In other words, during the initial charge/discharge cycle of a battery, i.e., while the electrolyte is retained in an amount sufficient for driving a battery, the second binder resin in the second porous coating layer absorbs the electrolyte and stores a part of the electrolyte therein. Then, for example, when the amount of electrolyte is reduced due to decomposition of electrolyte while the battery cycles proceed, the electrolyte stored in the second binder resin of the second porous coating layer allows stable driving of the battery.

According to the present disclosure, the second porous coating layer includes the binder resin in an amount of 20-45 wt %, or 25-40 wt %, based on the total weight of the porous coating layer. When the content of the binder resin is excessively high beyond the above-defined range, the resistance of the separator is increased, resulting in degradation of battery performance. Meanwhile, when the content of the binder resin is less than the above-defined resin, the binder resin cannot provide a desired level of electrolyte storability.

In addition, according to the present disclosure, the second binder resin preferably has a high swelling degree (swelling ratio) in the presence of an electrolyte.

According to an embodiment of the present disclosure, the binder resin preferably has high electrolyte absorbability and retentivity. Considering this, the binder resin may have a swelling degree of 5% or more, 10% or more, 20% or more, 30% or more, or 40% or more, in the presence of an electrolyte. Meanwhile, the swelling degree may be 80% or less. The swelling degree may be calculated according to the following Formula 1:

$$\text{Swelling degree (\%)} = [(V_1 - V_2)/V_1] \times 100, \quad \text{[Formula 1]}$$

wherein $V_1$ represents a volume before swelling and $V_2$ represents a volume after swelling.

According to an embodiment of the present disclosure, the electrolyte and the second binder resin may be those applied actually to manufacture of a battery. After determining a combination of an electrolyte with a second binder resin from the second binders and electrolytes as described hereinafter, it can be applied to a battery.

According to an embodiment of the present disclosure, when determining the swelling degree in the presence of an electrolyte, the electrolyte includes an organic solvent. For example, the electrolyte may be a mixture containing ethylene carbonate (EC) and propylene carbonate (PC) at a volume ratio of 30:70 (EC:PC). The electrolyte used for determination of the electrolyte absorbability may include no lithium salt, or may optionally include a lithium salt. According to an embodiment of the present disclosure, the electrolyte may include a lithium salt, such as $LiPF_6$, at a concentration of 1 mol in a mixed organic solvent containing EC and PC at a volume ratio of 30:70 (EC:PC).

According to an embodiment of the present disclosure, the second binder resin preferably has a solubility parameter of 15-45 $MPa^{1/2}$, more preferably 15-25 $MPa^{1/2}$ and 30-45 $MPa^{1/2}$. Therefore, the binder resin advantageously includes a hydrophilic polymer having many polar groups rather than a hydrophobic polymer, such as polyolefin. When the solubility parameter is not within the above-defined range, i.e., when the solubility parameter is less than 15 $MPa^{1/2}$ and more than 45 $MPa^{1/2}$, it is difficult for the binder resin to be swelled with a conventional organic solvent for an electrolyte.

Non-limiting examples of the second binder resin that may be used in the present disclosure include any one selected from the group consisting of polyvinylidene fluoride (PVdF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethyl pullulan, cyanoethylpolyvinyl alcohol, cyanoethyl cellulose, cyanoethyl sucrose, pullulan, carboxymethyl cellulose, and combinations thereof. In addition, the binder resin preferably satisfies at least one condition selected from the above-defined swelling degree, dissolution rate and solubility.

According to an embodiment of the present disclosure, the second binder resin may include polyvinylidene fluoride-co-hexafluoropropylene (PVdF-HFP), which is a polyvinylidene fluoride (PVdF)-based binder resin containing hexafluoroporpylene (HFP) as a comonomer. Preferably, PVdF-HFP may have a HFP substitution degree of 10-30 wt %. The substitution degree may be controlled adequately within the above-defined range with a view to resistance characteristics or electrolyte holding amount. For example, with a view to electrolyte holding amount, the substitution degree may be controlled to 20 wt % or more, or 25%. Otherwise, with a view to resistance characteristics, the substitution degree may be controlled to 20 wt % or less, or 15 wt % or less. When the HFP substitution degree in PVdF-HFP satisfies the above-defined range, the binder resin in the second porous coating layer sufficiently absorbs an electrolyte and can maintain electrolyte holding amount adequately.

The second porous coating layer may have a porous structure derived from the interstitial volumes among the inorganic particles. As used herein, the term 'interstitial volume' means a space defined by the adjacent inorganic particles substantially in contact with each other.

According to an embodiment of the present disclosure, the particle size of the inorganic particles in the porous coating layer is not particularly limited. However, with a view to formation of a coating layer having a uniform thickness and an adequate porosity, the particle size may be 0.001-10 μm. When the inorganic particles satisfy the above-defined range, it is easy to maintain dispersibility and to control the physical properties of the separator and it is possible to prevent an increase in thickness of the porous coating layer. Thus, it is possible to improve the mechanical properties. In addition, it is possible to reduce an internal short-circuit during charge/discharge caused by an excessively large pore size.

According to the present disclosure, the inorganic particles preferably undergo no change in physical properties even at a high temperature of 200° C. or higher. In addition, the inorganic particles are not particularly limited, as long as they are electrochemically stable. In other words, the inorganic particles are not particularly limited, as long as they cause no oxidation and/or reduction in the operating voltage range (e.g. 0-5 V based on $Li/Li^+$) of an applicable electrochemical device. According to an embodiment of the present disclosure, the inorganic particles may include any one selected from the group consisting of $BaTiO_3$, $Pb(Zr,Ti)O_3$ (PZT), $Pb_{1-x}La_xZr_{1-y}Ti_yO_3$ (PLZT, 0<x<1, 0<y<1), $Pb(Mg_{1/3}Nb_{2/3})O_3$—$PbTiO_3$(PMN-PT, 0<x<1), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$, and combinations thereof.

Meanwhile, according to an embodiment of the present disclosure, the second porous coating layer may include porous inorganic particles separately from or in combination with the above-mentioned inorganic particles. For example, the porous inorganic particle may include at least one selected from zeolite, aluminophosphate, aluminosilicate, titanosilicate, calcium phosphate, zirconium phosphate and silica gel. When using such porous inorganic particles, it is possible to increase electrolyte holding amount. In addition, the porous inorganic particles allow HF or moisture to be isolated in the pores, and thus help smooth charge/discharge. Considering this, the inorganic particles may have a pore size of 1-50 nm. Meanwhile, according to an embodiment of the present disclosure, the second porous coating layer may have a multi-layer structure including a plurality of single layers stacked successively, wherein the layer formed on the surface of the porous substrate preferably includes porous inorganic particles as inorganic particles.

According to an embodiment of the present disclosure, the second porous coating layer may have a porosity of 10-40%. Within the above-defined range, the lower limit may be controlled to 15%, 20% or 25%, or the upper limit may be controlled to 35% or 30%. The porosity may be measured by preparing slurry for forming the second porous coating layer and applying the slurry to a release film to form a separate second porous coating layer. In other words, it is possible to set a composition and processing condition which can ensure the porosity within the above-defined range by an experimental method and to apply the same to an actual manufacturing process.

In addition, the second porous coating layer may have a thickness of 1-20 μm. Within the above-defined range, the thickness may be 3 μm or more, 5 μm or more, or 7 μm or more, with a view to mechanical strength and safety. In addition, with a view to energy density, the thickness may be 10 μm or less, or 5 μm or less. For example, considering the above-mentioned conditions, the second porous coating layer may have a thickness of 2-7 μm, or 2-5 μm.

The second porous coating layer may be obtained by introducing the inorganic particles to a mixture containing the binder resin dissolved or dispersed in a suitable solvent to form homogeneous slurry, and coating one surface of the porous substrate with the slurry. The coating may be carried out by dip coating, die coating, roll coating, comma coating or a combination thereof.

Lithium Metal Battery

The present disclosure provides a secondary battery including a positive electrode, a negative electrode and a separator interposed between the positive electrode and the negative electrode. In the secondary battery, the separator have the above-described structural characteristics, wherein the second porous coating layer having a relatively higher content of binder resin faces the negative electrode, and the negative electrode includes lithium metal as a negative electrode active material.

Hereinafter, the lithium metal battery will be explained in detail with reference to the constitution thereof.

According to an embodiment of the present disclosure, the negative electrode may include a current collector and a negative electrode active material layer formed on the surface of the current collector. The negative electrode active material layer may include at least one selected from alkali metals, alkaline earth metals, Group 3B metals and transition metals. According to an embodiment of the present disclosure, non-limiting examples of the metal may include lithium (Li), sodium (Na), potassium (K), rubidium (Rb), cesium (Cs) or francium (Fr), preferably lithium. According to an embodiment of the present disclosure, the negative electrode may be obtained by stacking the negative electrode current collector with lithium metal foil having a desired thickness through compression and binding.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

In general, the current collector is formed to have a thickness of 3-500 μm. The current collector is not particularly limited, as long as it causes no chemical change in the corresponding battery and has high conductivity. Particular examples of the current collector may include stainless steel; aluminum; nickel; titanium; baked carbon; stainless steel surface-treated with carbon, nickel, titanium or silver; or the like. Any suitable current collector may be used according to the polarity of a positive electrode or negative electrode.

The binder for a positive electrode active material is an ingredient which assists the binding between an active material with a conductive material and the binding to a current collector. In general, the binder is added in an amount of 1-50 wt % based on the total weight of the positive electrode mixture. The binder may be high-molecular weight polyacrylonitrile-co-acrylate, but is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butyrene rubber, fluororubber, various copolymers, or the like.

The conductive material is an ingredient not causing any chemical change in the corresponding battery. Particular examples of the conductive material include: graphite, such as natural graphite or artificial graphite; carbon black, such as carbon black, acetylene black, Ketjen black (trade name), carbon nanotubes, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

According to the present disclosure, the electrolyte includes an organic solvent and a predetermined amount of lithium salt. Particular examples of the organic solvent include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), flouroethylene carbonate (FEC), methyl formate, ethyl formate, propyl formate, methyl acetate, ethyl acetate, propyl acetate, pentyl acetate, methyl propionate, ethyl propionate, butyl propionate, or a combination thereof. In addition, halogen derivatives of the organic solvents and linear ester compounds may also be used. The lithium salt is an ingredient easily soluble in the non-aqueous electrolyte, and particular examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lower aliphatic lithium carboxylate, lithium tetraphenylborate, imides, or the like.

The secondary battery according to the present disclosure may be obtained by receiving and sealing an electrode assembly including positive electrodes and negative electrodes stacked alternatively with separators interposed therebetween in a casing material, such as a battery casing, together with an electrolyte. Any conventional methods for manufacturing a secondary battery may be used with no particular limitation.

In another aspect, there are provided a battery module including the secondary battery as a unit cell, and a battery pack including the battery module. Since the battery module and battery pack include a secondary battery which shows excellent quick charging characteristics at a high loading amount, they may be used as power sources for electric vehicles, hybrid electric vehicles, Plug-In hybrid electric vehicles and power storage systems.

Meanwhile, reference will be made to description about elements used conventionally in the field of a battery, particularly a lithium secondary battery, about other battery elements not described herein, such as a conductive material.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(1) Manufacture of Separator

Example 1

Al$_2$O$_3$(Sumitomo Chemical, 500 nm) was mixed with PVdF-HFP (HFP substitution degree 5 wt %) at a weight ratio of 7:3 and the resultant mixture was introduced to acetone to obtain slurry for forming a second porous coating layer. The slurry was applied to one surface of a porous substrate (thickness 5 μm, porosity 40%) made of polyethylene through doctor blade coating and dried naturally at room temperature (25° C.) to form the second porous coating layer having a thickness of about 5 μm. Next, Al$_2$O$_3$ was mixed with PVdF-HFP at a weight ratio of 9:1 and the resultant mixture was introduced to acetone to obtain slurry for forming a first porous coating layer. The slurry was applied to the other surface of the porous substrate having the second porous coating layer through doctor blade coating and dried naturally at room temperature (25° C.) to form the first porous coating layer having a thickness of about 5 μm.

Example 2

A separator was obtained in the same manner as described in Example 1, except that PVdF-HFP used for the slurry for forming the second porous coating layer had a HFP substitution degree of 20 wt %.

Example 3

A separator was obtained in the same manner as described in Example 1, except that the slurry for forming the second porous coating layer was formed by using a mixture containing zeolite particles (Sigma Aldrich, particle size 1 μm), Al$_2$O$_3$(Sumitomo Chemical, particle size) and PVdF-HFP (HFP substitution degree 20 wt %) at a weight ratio of 4:3:3, as porous particles, and introducing the particles to acetone.

Example 4

As porous particles, zeolite particles (Sigma Aldrich, particle size 1 μm) were mixed with PVdF-HFP (HFP substitution degree 20 wt %) at a weight ratio of 7:3. The resultant mixture was introduced to acetone to obtain slurry (A) for forming a second porous coating layer. In addition, Al$_2$O$_3$(Sumitomo Chemical) was mixed with PVdF-HFP (HFP substitution degree 20 wt %) at a weight ratio of 7:3. The resultant mixture was introduced to acetone to obtain slurry (B) for forming a second porous coating layer. The slurry (A) was applied to one surface of a porous substrate (thickness 5 μm, porosity 40%) made of polyethylene through doctor blade coating, and then the slurry (B) was applied to the surface of the slurry (A). After that, the coated substrate was dried naturally at room temperature (25° C.) to form the second porous coating layer having a thickness of about 5 µm. Herein, the layer formed from slurry (A) had a thickness of about 3 µm and the layer formed from slurry (B) had a thickness of about 2 µm. Then, $Al_2O_3$ was mixed with PVdF-HFP at a weight ratio of 9:1 and the resultant mixture was introduced to acetone to obtain slurry for forming a first porous coating layer. The slurry was applied to the other surface of the porous substrate having the second porous coating layer through doctor blade coating and dried naturally at room temperature (25° C.) to form the first porous coating layer having a thickness of about 5 µm.

Meanwhile, each of the first porous coating layer and the second porous coating layer used for providing each of the separators according to Examples 1-4 conforms to the composition and processing conditions determined experimentally so that the porosity may satisfy the above-defined range.

Comparative Example 1

$Al_2O_3$ was mixed with polyvinylidene fluoride (PVdF) at a weight ratio of 8:2 and the resultant mixture was introduced to acetone to obtain slurry for forming a porous coating layer. The slurry was applied to both surfaces of a porous substrate through doctor blade coating and dried naturally at room temperature (25° C.) to form a porous coating layer having a thickness of about 5 µm on each surface.

Comparative Example 2

$Al_2O_3$ was mixed with PVdF-HFP (HFP substitution degree 5%) at a weight ratio of 9:1 and the resultant mixture was introduced to acetone to obtain slurry for forming a porous coating layer. The slurry was applied to both surfaces of a porous substrate through doctor blade coating and dried naturally at room temperature (25° C.) to form a porous coating layer having a thickness of about 5 µm on each surface.

(2) Tests

1) Determination of Volumetric Swelling Ratio of Separator

First, 1 g of each second binder resin used for each of Examples and Comparative Examples was dipped in an electrolyte (containing 1M $LiPF_6$) including ethylene carbonate and propylene carbonate at a volume ratio of about 3:7 for 30 hours. Then, each separator was taken out of the electrolyte and volumetric swelling ratio was determined according to the above Formula 1.

2) Determination of Ion Conductivity

Each of the separators according to Examples and Comparative Examples was cut into a size of 40 mm×60 mm (width×length) and disposed between two stainless steel (SUS) sheets. Next, an electrolyte (containing 1M $LiPF_6$) including ethylene carbonate and propylene carbonate at a volume ratio of about 3:7 was injected thereto to obtain a coin cell. The coin cell was determined for electrochemical impedance by using an analyzer (VMP3, Bio logic science instrument) at 25° C. under the conditions of an amplitude of 10 mV and a scan range of 100 kHz to 10 kHz.

3) Evaluation of Capacity Maintenance and Initial Charge/Discharge Efficiency

A positive electrode active material ($LiNi_{0.6}CO_{0.2}Mn_{0.2}O_2$), a conductive material (Super P) and PVdF were introduced to acetone at a weight ratio of 95.6:1.0:3.4 and mixed therein to obtain positive electrode slurry. The slurry was applied uniformly to aluminum foil having a thickness of 20 µm. The coating was carried out at an electrode drying temperature of 80° C. and a coating rate of 0.2 m/min. The resultant electrode was pressed by using a roll press apparatus to a porosity of 28%, thereby providing a target thickness. Next, the electrode was dried in a vacuum oven at 130° C. for 8 hours. The negative electrode was lithium metal having a thickness of 20 µm. In each battery, each of the separators according to Examples 1-4 and Comparative Examples 1 and 2 was interposed between the positive electrode and the negative electrode. Herein, in each battery using each of the separators according to Examples 1-4, the second porous coating layer of each battery was disposed so that it might face the negative electrode. In this manner, coin cells were assembled. An electrolyte was injected to each cell and allowed to stand for 30 hours so that the electrolyte might infiltrate into the electrode sufficiently. The electrolyte includes a mixed organic solvent containing ethylene carbonate and ethyl methyl carbonate at a volume ratio of 3:7 and also contains $LiPF_6$ at a concentration of 1M.

Then, charging was carried out in a constant current/constant voltage (CC/CV) mode at 0.1 C/4.25V and 0.05 C cut, and discharging was carried out at 0.5V to 3V in a CC mode. Such charging/discharging was carried out for 150 cycles to evaluate capacity maintenance. In addition, C-rate characteristics were determined in a CC mode with charging at 0.1 C and discharging at 3 C.

Capacity maintenance and initial charge/discharge efficiency were calculated according to the following Formula 3 and Formula 4.

Capacity maintenance (%)=[Discharge capacity at the $150^{th}$ cycle/Discharge capacity at the $2^{nd}$ cycle]×100    [Formula 3]

C-rate performance (%)=[Discharge capacity at the $1^{st}$ cycle/Charge capacity at the $1^{st}$ cycle]×100    [Formula 4]

The test results are shown in the following Table 1.

TABLE 1

| | Volumetric swelling ratio of the second binder resin (%) | Ion conductivity ($10^{-4}$ S/cm) | Capacity maintenance ($150^{th}$ cycle, %) | Evaluation of C-rate performance (3 C-rate, 1 cycle %) |
|---|---|---|---|---|
| Example 1 | 45 | 8 | 79 | 75 |
| Example 2 | 60 | 12 | 86 | 80 |
| Example 3 | 62 | 14 | 92 | 82 |
| Example 4 | 61 | 13 | 91 | 81 |
| Comp. Ex. 1 | 35 | 5 | 65 | 65 |
| Comp. Ex. 2 | 44 | 15 | 67 | 82 |

As can be seen from Table 1, as the content of the binder resin in the second porous coating layer and HFP substitution ratio are increased, the amount of electrolyte absorbed by the second porous coating layer (electrolyte holding amount) is increased to provide higher electrochemical characteristics. It can be seen from the results that the swelling ratio of a binder resin is closely related to the life characteristics of a battery. In addition, even when the second porous coating layer has a high content of binder resin, ion conductivity is not decreased by virtue of the use of a polymer resin having a high swelling ratio. Further, when the second porous coating layer includes porous particles, such effects are further improved.

Additionally, in the case of the first porous coating layer, when the content of binder resin is reduced and the content of inorganic particles is increased, the electrolyte holding amount in the pores of the first porous coating layer can be increased to provide improved ion conductivity and improved output characteristics of a battery.

What is claimed is:

1. A lithium ion secondary battery comprising:
a positive electrode,
a negative electrode comprising lithium metal as a negative electrode active material,
an electrolyte, and
a separator interposed between the positive electrode and the negative electrode, the separator comprises:
   a porous substrate;
   a first porous coating layer disposed on one surface of the porous substrate; and
   a second porous coating layer disposed on an opposite surface of the porous substrate,
   wherein the first porous coating layer comprises inorganic particles and a first binder resin, and a content of the first binder resin is 1-15 wt % based on 100 wt % of the first porous coating layer,
   the second porous coating layer comprises a filler containing at least one selected from the group consisting of organic fillers and inorganic fillers, and a second binder resin, where a content of the second binder resin is 25-40 wt % based on 100 wt % of the second porous coating layer,
   the second binder resin comprises polyvinylidene fluoride-co-hexafluoropropylene PVdF-HFP has a HFP substitution degree of 10-30 wt %, (PVdF-HFP) containing hexafluoropropylene (HFP) as a comonomer, and
   wherein the content of the second binder resin in the second porous coating layer is different from and higher than the content of the first binder resin in the first porous coating layer,
the separator is disposed such that the second porous coating layer of the separator faces the negative electrode, and
the first porous coating layer has a porosity of 40-80%, and the second porous coating layer has a porosity of 10-35%.

2. The lithium ion secondary battery according to claim 1, wherein the inorganic filler of the second porous coating layer comprises porous particles.

3. The lithium ion secondary battery according to claim 2, wherein the porous particles comprise at least one selected from a zeolite, an aluminophosphate, an aluminosilicate, a titanosilicate, calcium phosphate, zirconium phosphate and silica gel.

4. The lithium ion secondary battery according to claim 1, wherein the second binder resin has a volumetric swelling degree of 5% or more in the presence of an electrolyte.

5. The lithium ion secondary battery according to claim 4, wherein the second binder resin has a volumetric swelling degree of 30-80% in the presence of an electrolyte.

6. The lithium ion secondary battery according to claim 1, wherein PVdF-HFP is a swellable binder resin which undergoes volumetric swelling by absorbing an electrolyte.

7. The lithium ion secondary battery according to claim 1, wherein the second porous coating layer has a thickness of 1-20 μm.

8. The lithium ion secondary battery according to claim 1, wherein the porous substrate is a polymer sheet which includes a polyolefinic polymer material and has at least one type of pore selected from open pores and closed pores.

9. The lithium ion secondary battery according to claim 1, wherein the electrolyte includes an organic solvent.

10. The lithium ion secondary battery according to claim 1, wherein the first porous coating layer has an average pore size of 20-1,000 nm.

11. The lithium ion secondary battery according to claim 1, wherein the first porous coating layer has a porosity of 50-70%.

12. The lithium ion secondary battery according to claim 1, wherein the first porous coating layer has a thickness of 1.5-5.0 μm.

13. The lithium ion secondary battery according to claim 1, wherein the PVdF-HFP has a HFP substitution degree of 20 wt % or less.

14. The lithium ion secondary battery according to claim 1, wherein the PVdF-HFP has a HFP substitution degree of 15 wt % or less.

15. The lithium ion secondary battery according to claim 1, wherein the second porous coating layer has a porosity of 15-30%.

16. The lithium ion secondary batter according to claim 1, wherein the first porous coating layer has an average pore size of 20-500 nm.

17. The lithium ion secondary batter according to claim 1, wherein the first porous coating layer and the second coating layer have a same thickness.

* * * * *